United States Patent
Kool et al.

(10) Patent No.: US 11,674,442 B2
(45) Date of Patent: Jun. 13, 2023

(54) GAS TURBINE ENGINE AND METHOD OF OPERATING

(71) Applicant: General Electric Company, Schenectady, NY (US)

(72) Inventors: Lawrence Bernard Kool, Clifton Park, NY (US); Brandon Flowers Powell, Mason, OH (US); Narendra Digamber Joshi, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 17/203,052

(22) Filed: Mar. 16, 2021

(65) Prior Publication Data
US 2021/0285376 A1   Sep. 16, 2021

Related U.S. Application Data

(60) Provisional application No. 62/990,174, filed on Mar. 16, 2020.

(51) Int. Cl.
*F02C 7/22* (2006.01)
*F02C 7/16* (2006.01)

(52) U.S. Cl.
CPC .............. *F02C 7/22* (2013.01); *F02C 7/16* (2013.01); *F05D 2220/323* (2013.01); *F05D 2260/213* (2013.01)

(58) Field of Classification Search
CPC ...... F02C 3/30; F02C 7/12; F02C 7/14; F02C 7/18; C10G 2300/405; F05D 2260/213; F05D 2220/323; F28D 2021/0021; F28D 2021/0022
See application file for complete search history.

(56) References Cited

U.S. PATENT DOCUMENTS

| | | | |
|---|---|---|---|
| 2,762,559 A | 9/1956 | Fought | |
| 5,392,595 A * | 2/1995 | Glickstein | F02C 6/18 60/39.12 |
| 6,357,217 B1 * | 3/2002 | Griffin | F02C 3/30 60/39.12 |
| 7,640,802 B2 | 1/2010 | King et al. | |
| 8,489,306 B2 | 7/2013 | Sahm et al. | |

(Continued)

FOREIGN PATENT DOCUMENTS

| | | |
|---|---|---|
| CA | 2821249 A1 | 6/2012 |
| CA | 2932461 A1 | 6/2015 |

(Continued)

OTHER PUBLICATIONS

US 11,345,864 B1, 05/2022, Sun (withdrawn)*

*Primary Examiner* — Craig Kim
(74) *Attorney, Agent, or Firm* — Dority & Manning, P.A.

(57) ABSTRACT

A gas turbine engine includes; a compressor, a combustor, and a turbine in serial flow relationship; a heat exchanger, the heat exchanger having an inlet, an outlet, and an internal surface coated with a catalyst, the heat exchanger being located upstream of the compressor; a source of hydrocarbon fuel in fluid communication with the inlet of the heat exchanger; a source of oxygen in fluid communication with the inlet of the heat exchanger; and a distribution system for receiving reformed hydrocarbon fuel from the heat exchanger.

18 Claims, 10 Drawing Sheets

(56) References Cited

U.S. PATENT DOCUMENTS

| | | | | |
|---|---|---|---|---|
| 8,931,283 B2* | 1/2015 | Khan | ..................... | F23R 3/28 |
| | | | | 60/737 |
| 9,346,553 B2 | 5/2016 | Gaulmin et al. | | |
| 9,499,747 B2 | 11/2016 | Wang et al. | | |
| 9,676,491 B2* | 6/2017 | Epstein | ................. | B64D 37/30 |
| 10,087,761 B2 | 10/2018 | Calvert et al. | | |
| 10,190,438 B2 | 1/2019 | Langford et al. | | |
| 10,301,031 B2 | 5/2019 | Colavincenzo et al. | | |
| 11,187,156 B2* | 11/2021 | Niergarth | ........... | B01D 19/0005 |
| 2002/0088221 A1* | 7/2002 | Griffin | ..................... | F23R 3/40 |
| | | | | 60/311 |
| 2015/0275762 A1* | 10/2015 | Kenyon | ................... | F02C 7/14 |
| | | | | 60/39.17 |
| 2017/0022428 A1 | 1/2017 | Wang et al. | | |
| 2017/0175856 A1 | 6/2017 | Beddok et al. | | |
| 2017/0260460 A1 | 9/2017 | Wang et al. | | |
| 2018/0179961 A1* | 6/2018 | Lavertu, Jr. | ............. | F02C 3/305 |
| 2019/0011202 A1* | 1/2019 | Phillips | .................. | F28F 27/02 |
| 2021/0139160 A1* | 5/2021 | Kool | ...................... | B64D 37/34 |
| 2021/0285376 A1* | 9/2021 | Kool | ...................... | F02C 7/22 |
| 2022/0356848 A1* | 11/2022 | Joshi | ...................... | F02C 7/224 |
| 2022/0364505 A1* | 11/2022 | Kim | ....................... | B64D 37/34 |

FOREIGN PATENT DOCUMENTS

| | | | | |
|---|---|---|---|---|
| WO | WO2015088671 A1 | 6/2015 | | |
| WO | WO-2015105589 A1 * | 7/2015 | .......... | B01J 19/0026 |
| WO | WO2015105589 A1 | 7/2015 | | |

* cited by examiner

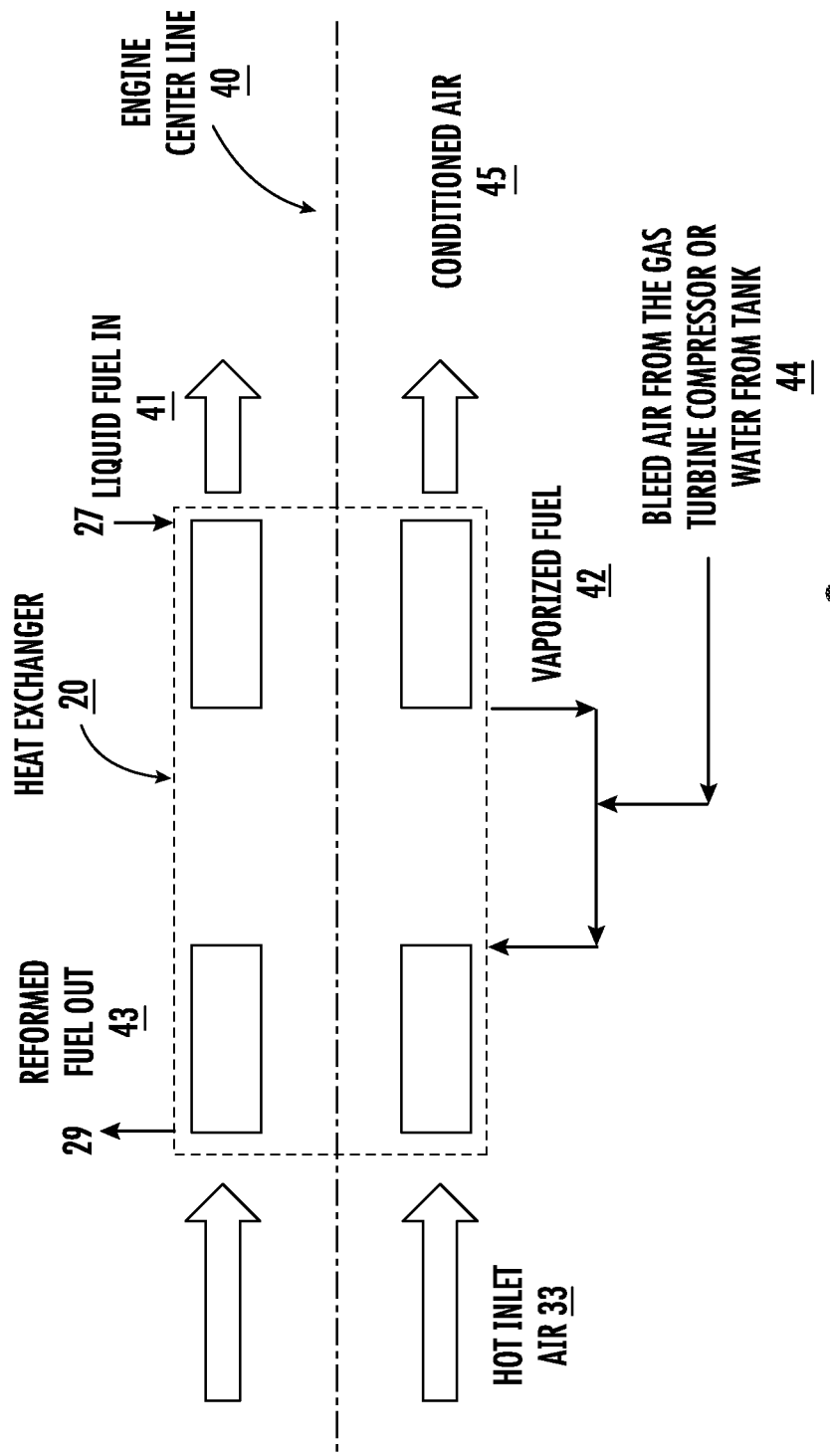

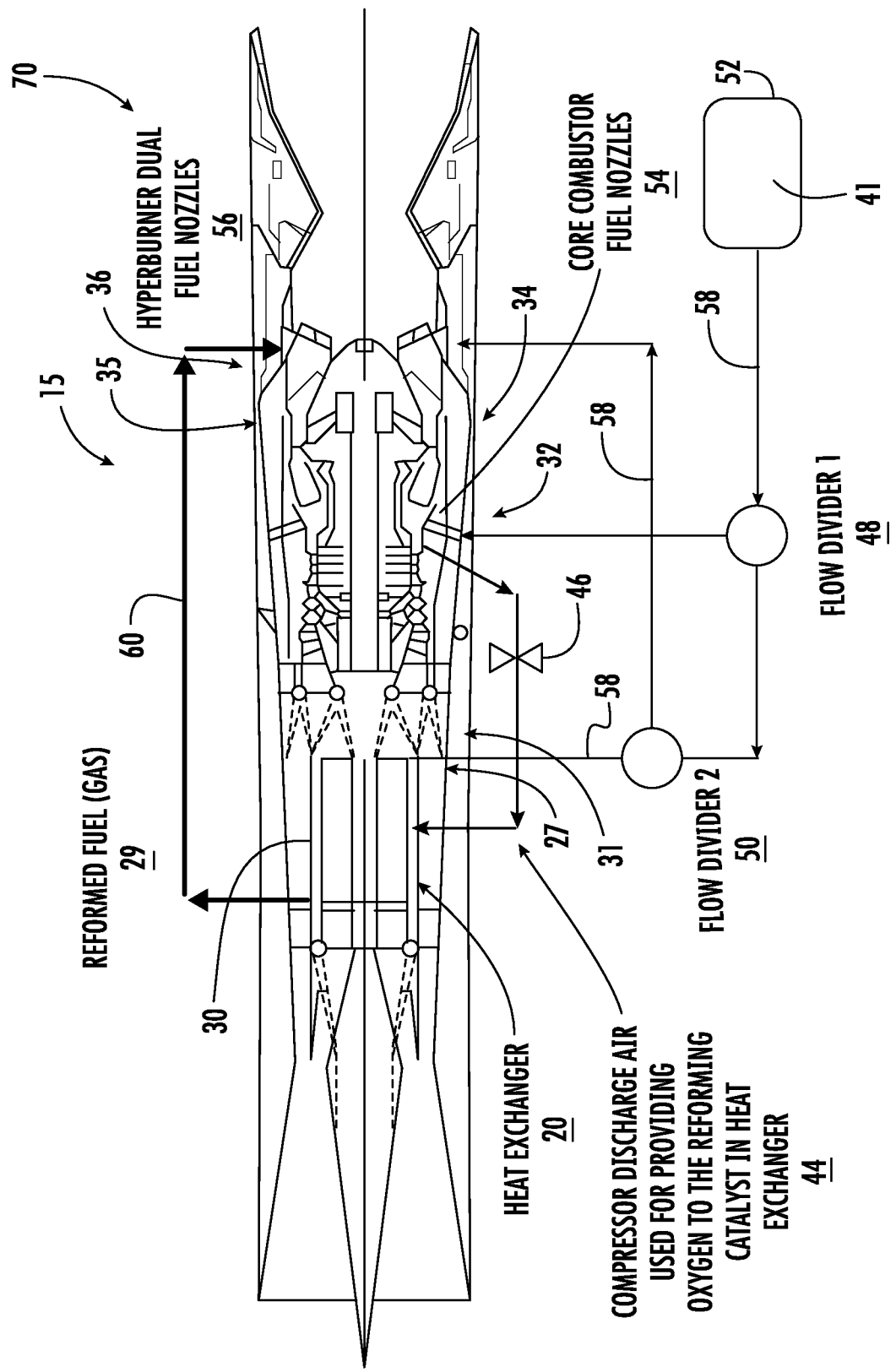

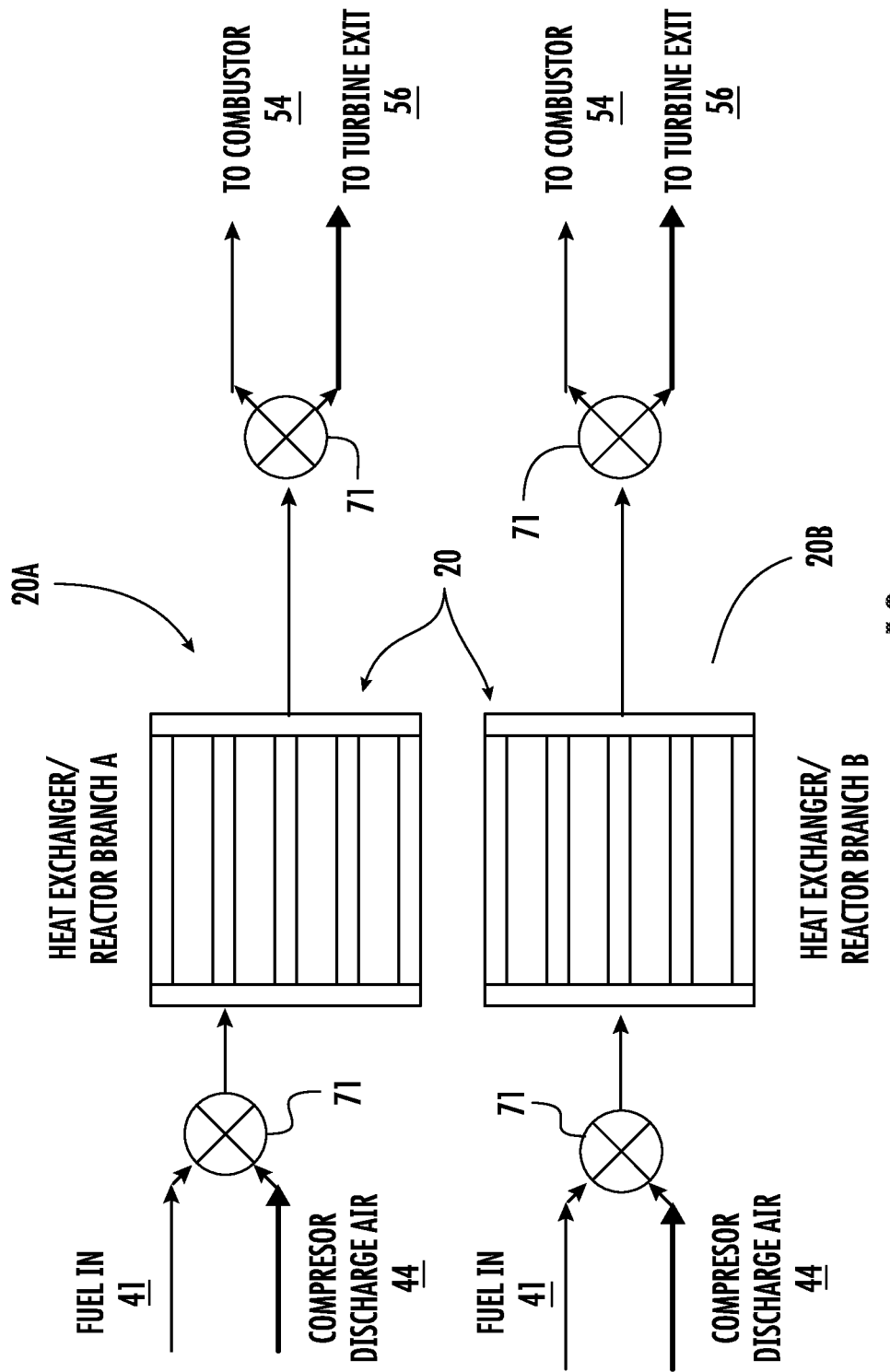

GAS TURBINE ENGINE AND METHOD OF OPERATING

PRIORITY INFORMATION

The present disclosure claims priority to U.S. Patent Application Ser. No. 62/990,174 filed on Mar. 16, 2020, which is incorporated by reference herein in its entirety.

FIELD OF TECHNOLOGY

The present invention pertains to aircraft components, such as gas turbine engines, and more particularly to those which are exposed to high levels of heat in operation, such as during high-speed flight.

BACKGROUND OF THE INVENTION

Many aircraft components are exposed to heat sources during operation, such as internal components of propulsion systems including gas turbine engines. Particularly during high-speed flight operations, these components as well as external components of the aircraft itself are exposed to heat from skin friction due to the speed with which the aircraft is traveling through the atmosphere. Components such as the aircraft skin, leading edges of structures such as wings, chines, and control surfaces, and engine inlets may be particularly affected in addition to the temperature of the air entering a gas turbine engine.

These heat sources may cause surface and internal temperatures of such aircraft components to exceed their structural and/or operational capabilities, requiring expensive or exotic materials and changes in operating characteristics.

It would therefore be desirable to provide a system and method for removing heat from aircraft components which is reliable and durable in operational service and capable of removing heat from such components during high-speed flight.

It would be further desirable to capture the heat for use in improving the propulsive efficiency of the aircraft.

BRIEF DESCRIPTION OF THE INVENTION

In one aspect, a gas turbine engine includes: a compressor, a combustor, and a turbine in serial flow relationship; a heat exchanger, the heat exchanger having an inlet, an outlet, and an internal surface coated with a catalyst, the heat exchanger being located upstream of the compressor; a source of hydrocarbon fuel in fluid communication with the inlet of the heat exchanger; a source of oxygen in fluid communication with the inlet of the heat exchanger; and a distribution system for receiving reformed hydrocarbon fuel from the heat exchanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which:

FIG. 8 is a schematic diagram illustrating a method of operating the exemplary embodiment of FIG. 5;

FIG. 9 is a cross-sectional schematic illustration of an exemplary embodiment of a gas turbine engine suitable for use as an aircraft propulsion system similar to the embodiment of FIG. 5, but adapted to include a hyperburner system; and FIG. 10 is a schematic illustration of an exemplary embodiment of a heat exchanger system which incorporates a plurality of heat exchangers similar to the heat exchanger of FIG. 4, the system being configured to operate with the gas turbine engine of FIG. 9.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Figure 1:
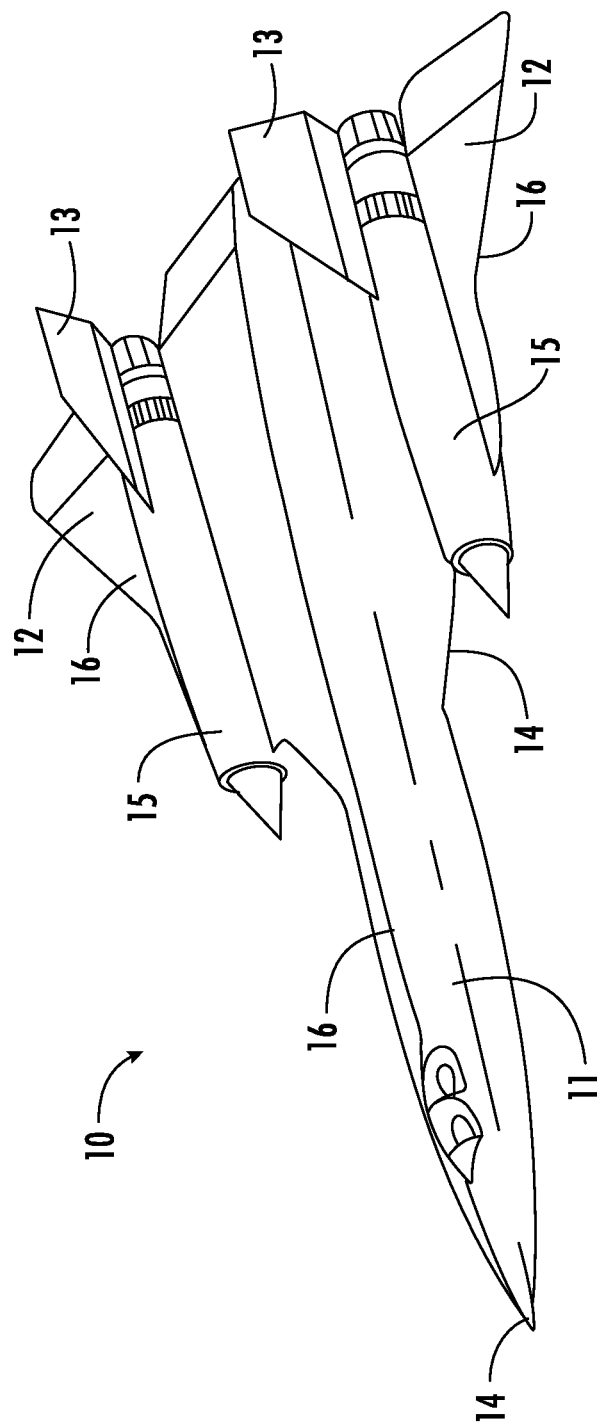
FIG. 1 is a perspective illustration of an exemplary embodiment of a high-speed aircraft suitable for implementing the heat removal apparatus and methods described herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise. Moreover, the suffix "(s)" as used herein is usually intended to include both the singular and the plural of the term that it modifies, thereby including one or more of that term.

As used herein, the term "or" is not meant to be exclusive and refers to at least one of the referenced components (for example, a material) being present and includes instances in which a combination of the referenced components may be present, unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity can be expected, while in other circumstances, the event or capacity cannot occur. This distinction is captured by the terms "may" and "may be".

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

Various aspects of the invention are explained more fully with reference to the exemplary embodiments discussed below. It should be understood that, in general, the features of one embodiment also may be used in combination with features of another embodiment, and that the embodiments are not intended to limit the scope of the invention.

FIG. 1 perspective illustration of an exemplary embodiment of a high-speed aircraft 10 suitable for implementing the heat removal apparatus and methods described herein. As used herein, the term "high-speed aircraft" is intended to refer to aircraft designed to operate above the speed of sound, i.e., above Mach 1, and more particularly to aircraft designed to operate in hypersonic flight regimes above Mach 5, such as in the range of Mach 5 to Mach 10.

In the configuration shown in FIG. 1, the exemplary high-speed aircraft 10 includes a fuselage 11, wings 12, vertical stabilizers 13, leading edges 14 of the wings 12 and fuselage 11, as well as gas turbine engines 15 serving as aircraft propulsion systems. An outer skin surface 16 covers at least portions of the fuselage 11 and wings 12. In high-speed flight, movement of the aircraft 10 through the atmosphere causes heating of aircraft surfaces such as the skin surface 16 on the exterior of the aircraft 10, and in particular causes heat buildup in the regions of the leading edges 14 of the wings 12 and fuselage 11. High-speed operation also causes the gas turbine engines 15 to experience high temperature operation as atmospheric air is reduced to subsonic speeds which increases pressures within the gas turbine engine. Each of these locations may utilize a system for removing heat from aircraft components as described herein. Systems of interest are further described in commonly-assigned, co-pending U.S. patent application Ser. No. 16/681,292, filed Nov. 12, 2019, the specification and drawings of which are included as Appendix 1 and Appendix 2, respectively.

Figure 2:
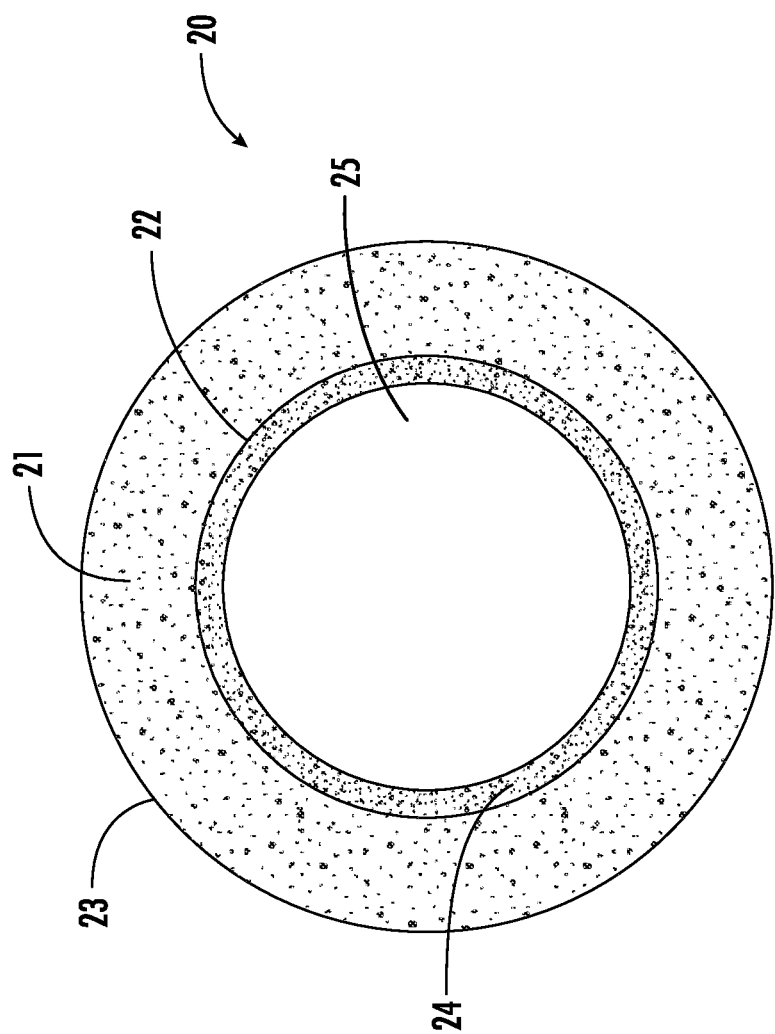
FIG. 2 is a cross-sectional schematic illustration of a tube of an exemplary heat exchanger as described herein.

FIG. 2 is a cross-sectional schematic illustration of a tube of an exemplary heat removal system 20 in the form of a heat exchanger as described herein. Heat removal system 20 includes at least one tubular structure 21 having an inner surface 22 and an outer surface 23. The inner surface 22 includes a coating 24, as will be described hereafter, and an interior space 25 located inwardly of the interior surface 22 and the coating 24 through which a fluid may pass.

The inner surface of the tubular structure 21, which is accessible to a fluid such as a hydrocarbon fuel in the interior space 25, comprises a coating 24 of perovskite material and the tuning material.

As used herein the term "hydrocarbon cracking", "cracking hydrocarbon", or any variation thereof, refers to but is not limited to processes in which hydrocarbons are cracked in apparatuses to obtain materials with smaller molecules. The hydrocarbon may include ethane, heptane, liquid petroleum gas, naphtha, gas oil, bottoms from atmospheric and vacuum distillation of crude oil, or any combination thereof.

As used herein the term "coke" or any variation thereof refers to but is not limited to carbonaceous solid or liquid, or particulates or macromolecules forming the carbonaceous solid or liquid, which are derived from coal, petroleum, wood, hydrocarbons and other materials containing carbon.

As used herein the term "perovskite material" or any variation thereof refers to but is not limited to any material having an $ABO_3$ perovskite structure and being of formula $A_aB_bO_{3-\delta}$, wherein $0.9 < a \le 1.2$; $0.9 < b \le 1.2$; $-0.5 < \delta < 0.5$; A comprises a first element and optionally a second element, the first element is selected from calcium (Ca), strontium (Sr), barium (Ba), lithium (Li), sodium (Na), potassium (K), rubidium (Rb) and any combination thereof, the second element is selected from yttrium (Y), bismuth (Bi), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu) and any combination thereof; and B is selected from silver (Ag), gold (Au), cadmium (Cd), cerium (Ce), cobalt (Co), chromium (Cr), copper (Cu), dysprosium (Dy), erbium (Er), europium (Eu), ferrum (Fe), gallium (Ga), gadolinium (Gd), hafnium (Hf), holmium (Ho), indium (In), iridium (Ir), lanthanum (La), lutetium (Lu), manganese (Mn), molybdenum (Mo), niobium (Nb), neodymium (Nd), nickel (Ni), osmium (Os), palladium (Pd), promethium (Pm), praseodymium (Pr), platinum (Pt), rhenium (Re), rhodium (Rh), ruthenium (Ru), antimony (Sb), scandium (Sc), samarium (Sm), tin (Sn), tantalum (Ta), terbium (Tb), technetium (Tc), titanium (Ti), thulium (Tm), vanadium (V), tungsten (W), yttrium (Y), ytterbium (Yb), zinc (Zn), zirconium (Zr), and any combination thereof.

In some embodiments, the perovskite material may be of formula $n(A_aB_bO_{3-\delta})$, in which $n=2, 3, 4, 8$, and etc., and the formula $A_aB_bO_{3-\delta}$ is the simplified form thereof. In some embodiments, in the $ABO_3$ perovskite structure, A cations are surrounded by twelve anions in cubo-octahedral coordination, B cations are surrounded by six anions in octahedral coordination and oxygen anions are coordinated by two B cations and four A cations. In some embodiments, the $ABO_3$ perovskite structure is built from corner-sharing $BO_6$ octahedra. In some embodiments, the $ABO_3$ perovskite structure includes distorted derivatives. The distortions may be due to rotation or tilting of regular, rigid octahedra or due to the presence of distorted $BO_6$ octahedra. In some embodiments, the $ABO_3$ perovskite structure is cubic. In some embodiments, the $ABO_3$ perovskite structure is hexagonal.

In some embodiments, A only comprises the first element. The first element may be a single element or a combination of elements selected from calcium (Ca), strontium (Sr), barium (Ba), lithium (Li), sodium (Na), potassium (K), and rubidium (Rb).

In some embodiments, A comprises a combination of the first element and the second element. The second element may be a single element or a combination of elements selected from yttrium (Y), bismuth (Bi), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Likewise, B may be a single element or a combination of elements selected from silver (Ag), gold (Au), cadmium (Cd), cerium (Ce), cobalt (Co), chromium (Cr), copper (Cu), dysprosium (Dy), erbium (Er), europium (Eu), ferrum (Fe), gallium (Ga), gadolinium (Gd), hafnium (Hf), holmium (Ho), indium (In), iridium (Ir), lanthanum (La), lutetium (Lu), manganese (Mn), molybdenum (Mo), niobium (Nb), neodymium (Nd), nickel (Ni), osmium (Os), palladium (Pd), promethium (Pm), praseodymium (Pr), platinum (Pt), rhenium (Re), rhodium (Rh), ruthenium (Ru), antimony (Sb), scandium (Sc), samarium (Sm), tin (Sn), tantalum (Ta), terbium (Tb), technetium (Tc), titanium (Ti), thulium (Tm), vanadium (V), tungsten (W), yttrium (Y), ytterbium (Yb), zinc (Zn), and zirconium (Zr).

In some embodiments, the perovskite material comprises $SrCeO_3$, $SrZr_{0.3}Ce_{0.7}O_3$, $BaMnO_3$, $BaCeO_3$, $BaZr_{0.3}Ce_{0.7}O_3$, $BaZr_{0.3}Ce_{0.5}Y_{0.2}O_3$, $BaZr_{0.1}Ce_{0.7}Y_{0.2}O_3$, $BaZrO_3$, $BaZr_{0.7}Ce_{0.3}O^3$, $BaCe_{0.5}Zr_{0.5}O_3$, $BaCe_{0.9}Y_{0.1}O_3$, $BaCe_{0.85}Y_{0.15}O_3$, or $BaCe_{0.8}Y_{0.2}O_3$. For example, for $SrCeO_3$, A is Sr, $a=1$, B is Ce, $b=1$, and $\delta=0$. For $SrZr_{0.3}Ce_{0.7}O_3$, A is Sr, $a=1$, B is a combination of Zr and Ce, $b=1$, and $\delta=0$. For $BaMnO_3$, A is Ba, $a=1$, B is Mn, $b=1$, and $\delta=0$. For $BaCeO_3$, A is Ba, $a=1$, B is Ce, $b=1$, and $\delta=0$. For $BaZr_{0.3}Ce_{0.7}O_3$, A is Ba, $a=1$, B is a combination of Zr and Ce, $b=1$, and $\delta=0$. For $BaZr_{0.3}Ce_{0.5}Y_{0.2}O_3$, A is Ba, $a=1$, B is a combination of Zr, Ce and Y, $b=1$, and $\delta=0$.

In some embodiments, the perovskite material comprises $La_{0.1}Ba_{0.9}Ce_{0.7}Zr_{0.2}Y_{0.1}O_3$, $Ce_{0.1}Ba_{0.9}Ce_{0.7}Zr_{0.2}Y_{0.1}O_{3.05}$, $Ce_{0.5}Ba_{0.5}Ce_{0.7}Zr_{0.2}Y_{0.1}O_{3.45}$, $Y_{0.1}Ba_{0.9}Ce_{0.7}Zr_{0.2}Y_{0.1}O_3$, $Y_{0.5}Ba_{0.5}Ce_{0.7}Zr_{0.2}Y_{0.1}O_{3.2}$, $Bi_{0.1}Ba_{0.9}Ce_{0.7}Zr_{0.2}Y_{0.1}O_3$, $Bi_{0.5}Ba_{0.5}Ce_{0.7}Zr_{0.2}Y_{0.1}O_{3.2}$, $Pr_{0.1}Ba_{0.9}Ce_{0.7}Zr_{0.2}Y_{0.1}O_3$, or $Pr_{0.5}Ba_{0.5}Ce_{0.7}Zr_{0.2}Y_{0.1}O_{3.2}$. For $La_{0.1}Ba_{0.9}Ce_{0.7}Zr_{0.2}Y_{0.1}O_3$, A is a combination of Ba and La, the first element is La, the second element is Ba, $a=1$, B is a combination of Ce, Zr and Y, $b=1$, and, $\delta=0$. For $Ce_{0.1}Ba_{0.9}Ce_{0.7}Zr_{0.2}Y_{0.1}O_{3.05}$ and $Ce_{0.5}Ba_{0.5}Ce_{0.7}Zr_{0.2}Y_{0.1}O_{3.45}$, A is a combination of Ce and Ba, the first element is Ce, the second element is Ba, $a=1$, B is a combination of Ce, Zr and Y, $b=1$, and, $\delta=-0.05$ and $-0.45$, respectively. For $Y_{0.1}Ba_{0.9}Ce_{0.7}Zr_{0.2}Y_{0.1}O_3$ and $Y_{0.5}Ba_{0.5}Ce_{0.7}Zr_{0.2}Y_{0.1}O_{3.2}$, A is a combination of Y and Ba, the first element is Y, the second element is Ba, $a=1$, B is a combination of Ce, Zr and Y, $b=1$, and, $\delta=0$ and $-0.2$, respectively. For $Bi_{0.1}Ba_{0.9}Ce_{0.7}Zr_{0.2}Y_{0.1}O_3$ and $Bi_{0.5}Ba_{0.5}Ce_{0.7}Zr_{0.2}Y_{0.1}O_{3.2}$, A is a combination of Bi and Ba, the first element is Bi, the second element is Ba, $a=1$, B is a combination of Ce, Zr and Y, $b=1$, and, $\delta=0$ and $-0.2$, respectively. Similarly, for $Pr_{0.1}Ba_{0.9}Ce_{0.7}Zr_{0.2}Y_{0.1}O_3$ and $Pr_{0.5}Ba_{0.5}Ce_{0.7}Zr_{0.2}Y_{0.1}O_{3.2}$, A is a combination of Pr and Ba, the first element is Pr, the second element is Ba, $a=1$, B is a combination of Ce, Zr and Y, $b=1$, and, $\delta=0$ and $-0.2$, respectively.

In some embodiments, the perovskite material comprises $BaZr_{0.3}Ce_{0.7}O_3$.

As used herein the term "tuning material" or any variation thereof refers to any material that reduces the yield of carbon monoxide in hydrocarbon cracking. The tuning material may comprise one material or a combination of multiple materials. In some embodiments, the tuning material comprises zirconium oxide, doped zirconium oxide, or any precursor or combination thereof.

In some embodiments, the method for cracking hydrocarbon is operated at a temperature in a range from about 700° C. to about 900° C. with the presence of steam, a weight ratio of steam to hydrocarbon is in a range from about 3:7 to about 7:3, and the hydrocarbon includes ethane, heptane, liquid petroleum gas, naphtha, gas oil, or any combination thereof.

In some embodiments, the method for cracking hydrocarbon is operated at a temperature in a range from about 480° C. to about 600° C. in the presence of steam, the hydrocarbon comprises bottoms from atmospheric and vacuum distillation of crude oil and a weight percentage of steam is in a range from about 1 wt % to about 2 wt %.

The perovskite material may or may not chemically react with the tuning material. Thus, the inner surface may comprise a combination or a reaction product of the perovskite material and the tuning material. In some embodiments, the inner surface comprises a combination of the perovskite material, the tuning material and a reaction product of the perovskite material and the tuning material.

The perovskite material and the tuning material may be in a coating applied to the apparatus using different methods, for example, air plasma spray, slurry coating, sol-gel coating, and solution coating. In some embodiments, the perovskite material and the tuning material are coated using slurry coating method.

The amount of the tuning material and the perovskite material in the slurry may vary as long as a continuous, strong, carbon monoxide reducing and anticoking coating is formed, depending on the specific tuning material and the perovskite material being used and the working condition of the coating. In some embodiments, a weight ratio of the perovskite material to the tuning material is from about 7:3 to about 7:93. In some embodiments, a weight of the perovskite material is equal to or less than that of the tuning material.

The slurry may further comprise an organic binder, an inorganic binder, a wetting agent, a solvent or any combination thereof to enhance the slurry wetting ability, tune the slurry viscosity or get good green coating strength. When the organic binder, the inorganic binder, the wetting agent, the solvent or any combination thereof is added in the slurry, a total weight percentage of the tuning material and the perovskite material in the slurry may be from about 10% to about 90%, or preferably from about 15% to about 70%, or more preferably from about 30% to about 55%.

In some embodiments, the slurry comprises the perovskite material, the tuning material, cerium oxide, yttrium oxide, glycerol, and polyvinyl alcohol (PVA).

The slurry may be applied to the apparatus by different techniques, such as at least one of sponging, painting, centrifuging, spraying, filling and draining, and dipping. In some embodiments, the slurry is applied by dipping, i.e., dipping the part to be coated in the slurry. In some embodiments, the slurry is applied by filling and draining, i.e., filling the slurry in the article to be coated and draining out the slurry afterwards by, e.g., gravity.

Additional descriptions of the cracking methods and systems may be found in published patent documents, all of which are incorporated by reference: U.S. Pat. No. 9,499,747, WO2015105589A1, CA2821249A1, US20170260460, CA2932461A1, WO2015088671A1, and US20170022428.

After the slurry is applied to the apparatus, a sintering process may be followed. As used herein the term "sintering" or any variation thereof refers to but is not limited to a method of heating the material in a sintering furnace or other heater facility. In some embodiments, the sintering temperature is in a range from about 850° C. to about 1700° C. In some embodiments, the sintering is at about 1000° C. In some embodiments, the sintering is carried out in an inert atmosphere such as argon or nitrogen. In some embodiments, the sintering is preceded by a heat treatment in air to form an oxide layer on the inner surface of the tube that improves coating adhesion.

In operation, a hydrocarbon such as an aircraft fuel is fed into the interior space 25 along with an oxygen-containing species, such as steam, which may be provided in the form of liquid water which vaporizes in the presence of sufficient heat, or oxygenated fuels such as ethanol or methanol. The cracking of the hydrocarbon fuel which takes place within the interior space 25 is an endothermic reaction in which all the carbon-carbon bonds are broken and hydrogen and methylene radicals are formed. This highly endothermic process takes heat away from, and therefore cools, the tubular structure 21 and its surrounding environment. The cracking of the hydrocarbon therefore transforms tubular structure 21 into a heat exchanger 20 and functions as a heat removal system which can be employed to remove heat from components 30 of a high-speed aircraft 10. The coating reduces or prevents the formation of coke in the interior space 25, which could eventually impede the flow of fuel and reduce the capability of the heat exchanger 20. The reformed fuel exiting the heat exchanger 20 may then be utilized as fuel for aircraft propulsion.

Figure 3:
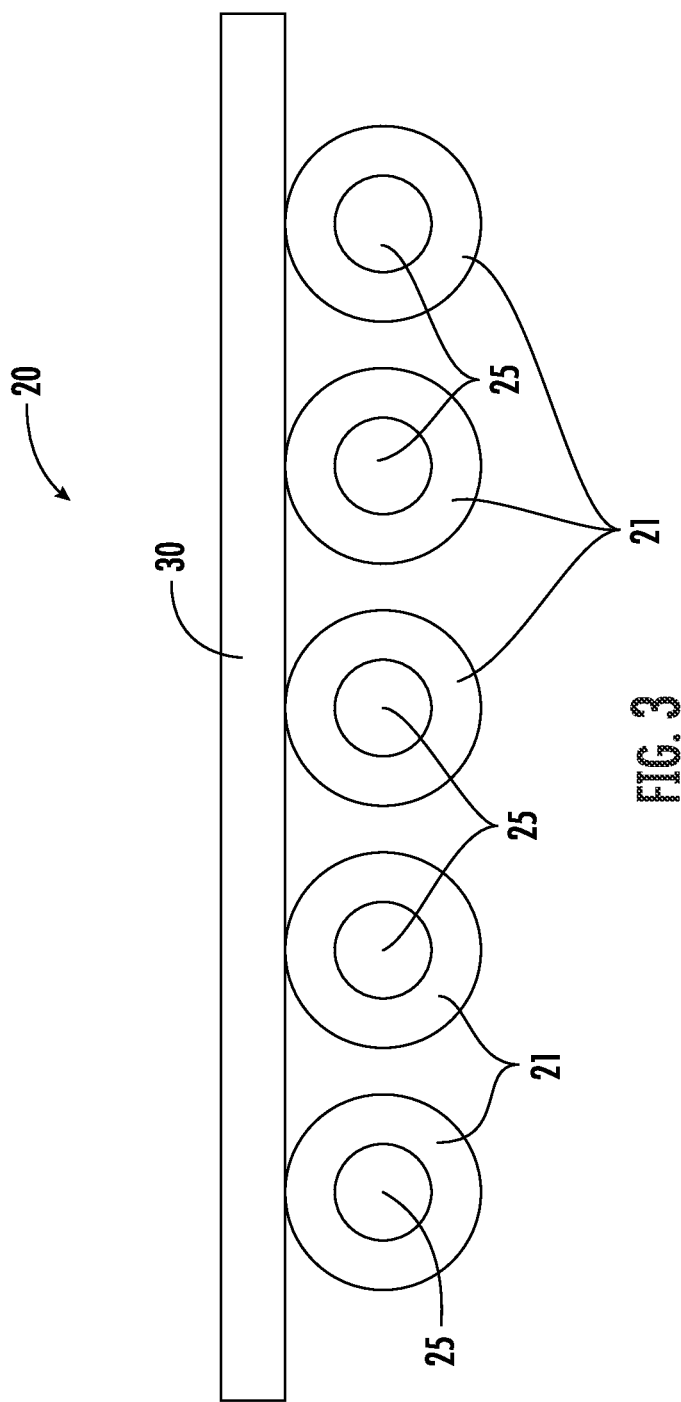
FIG. 3 is a cross-sectional schematic illustration of an exemplary embodiment of a heat exchanger as described herein having an array of a plurality of tubular structures.

FIG. 3 is a cross-sectional schematic illustration of an exemplary embodiment of a heat removal system in the form of heat exchanger 20 as described herein, having an array of a plurality of tubular structures 21, each with an interior space 25. The heat exchanger 20 is located in close proximity to an aircraft component 30, from which it is desired to remove thermal energy (heat). Heat exchanger 20 may be joined to, or integrally formed with, the aircraft component through conventional or additive manufacturing techniques known in the art. Alternatively, heat exchanger 20 may be employed as an air-to-fuel heat exchanger and thus utilized to remove heat from an air stream flowing through the array of tubular structures 21.

Figure 4:
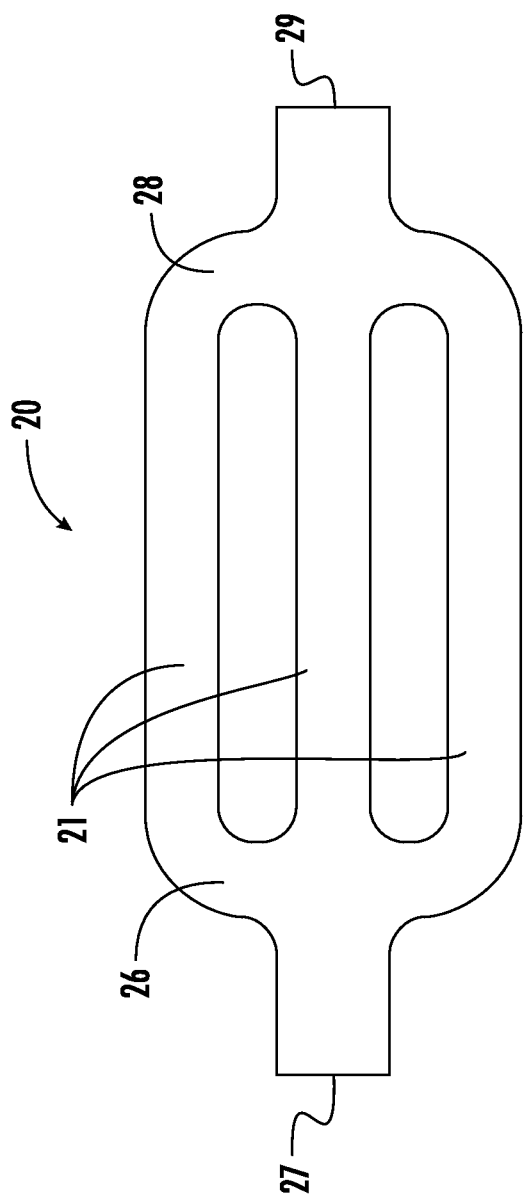
FIG. 4 is a plan view schematic illustration of an exemplary embodiment of a heat exchanger as described herein, having an array of a plurality of tubular structures and depicting inlet and outlet manifolds.

FIG. 4 is a plan view schematic illustration of an exemplary embodiment of a heat exchanger 20 as described herein, having an array of a plurality of tubular structures 21 and depicting inlet and outlet manifolds, 26 and 28, respectively. Manifolds 26 and 28, respectively, fluidly couple inlet and outlet ends of the tubular structures 21 to common inlet 27 and outlet 29. Inlet 27 may be in turn fluidly coupled to a pipe or conduit which is a source of hydrocarbon fuel and/or steam (water). Outlet 29 may be in turn fluidly coupled to a pipe or conduit which is a destination or recipient of reformed fuel after cracking takes place within the tubular structures 21 of the heat exchanger 20.

A heat exchanger as described herein may in fact comprise a plurality of heat exchangers separately manifolded, in addition to a plurality of tubular structures sharing a common manifold. A control system, comprising sensors, valves, and/or electronic control actuators may control flow through individual tubular structures and/or between and among a plurality of heat exchangers. This may provide flexibility for different operating conditions as well as to cycle between heat exchangers if it is necessary or desirable to take some tubular structures or some heat exchangers offline to remove any coke deposits which may accumulate during operation.

Figure 5:
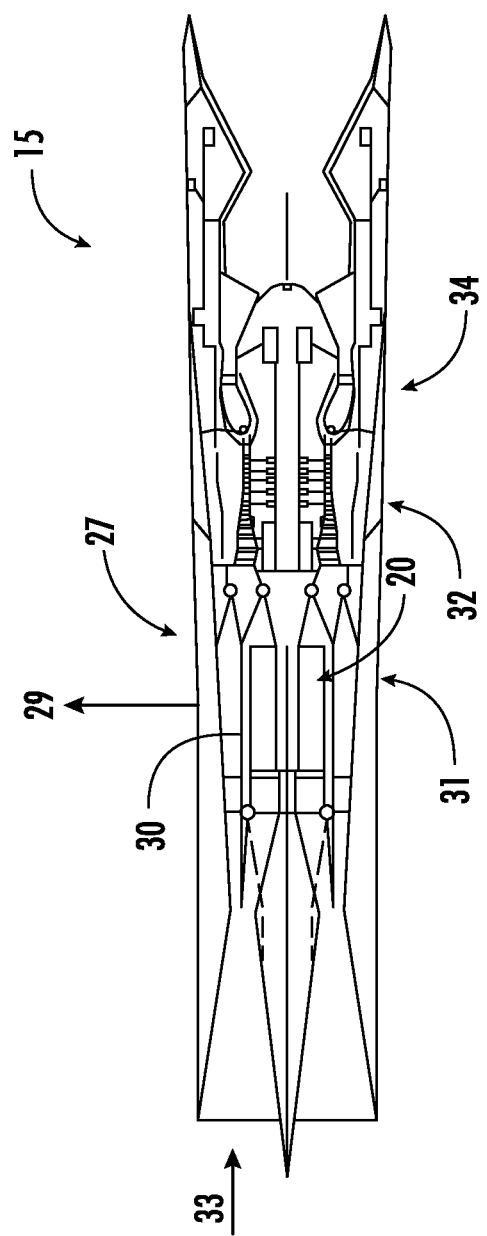
FIG. 5 is a cross-sectional schematic illustration of an exemplary embodiment of a gas turbine engine suitable for use as an aircraft propulsion system and incorporating a heat exchanger as described herein.

FIG. 5 is a cross-sectional schematic illustration of an exemplary embodiment of a gas turbine engine 15 suitable for use as an aircraft propulsion system for high-speed aircraft 10 and incorporating a heat exchanger 20 as described herein. As shown in FIG. 5, the heat exchanger 20, containing catalyst coating 24 within tubular structures 21, is located within the inlet section 31 of the gas turbine engine 15. The casing surrounding the inlet section serves as the aircraft component 30 which is it desired to remove heat from which is generated by and transported by the incoming air stream 33 during high-speed flight. This lowers the temperature of the air prior to entering the compressor section 32 of the gas turbine engine 15. The reformed fuel exiting the heat exchanger 20 may then be fed into the combustor section 34 of the gas turbine engine 15.

Figure 6:
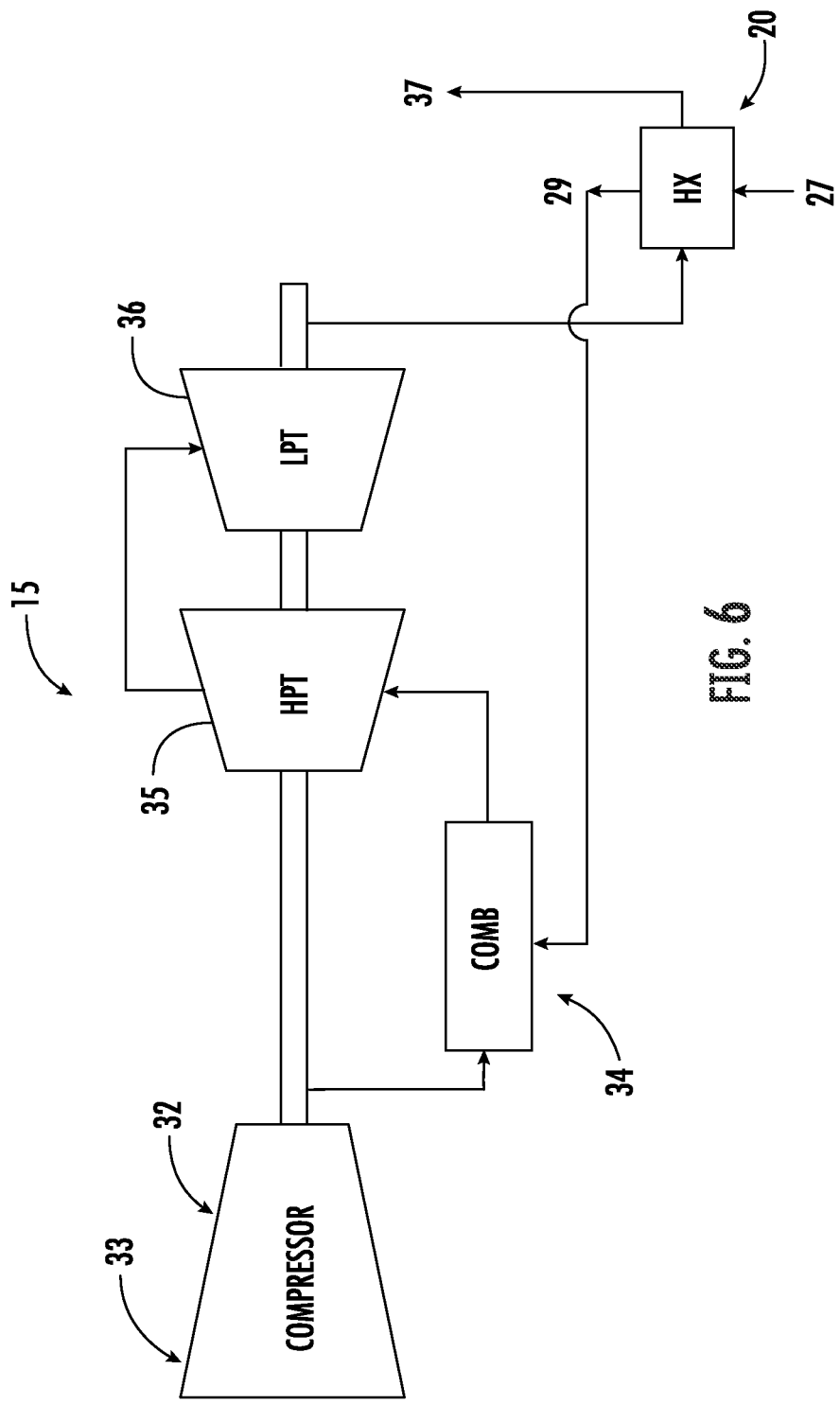
FIG. 6 is a schematic illustration of a gas turbine engine utilizing a heat exchanger as described herein downstream of the last turbine stage to reform a hydrocarbon fuel.

FIG. 6 is a schematic illustration of a gas turbine engine 15 utilizing a heat exchanger 20 as described herein downstream of the last turbine stage, aft of the high pressure turbine 35 and low pressure turbine 36, to reform a hydrocarbon fuel. The heat contained in the residual stream of air exiting the low pressure turbine 36 provides the energy to crack the fuel and is then exhausted to the atmosphere 37. As discussed previously, the reformed fuel may be fed into the combustor 34 to fuel the gas turbine engine 15.

Figure 7:
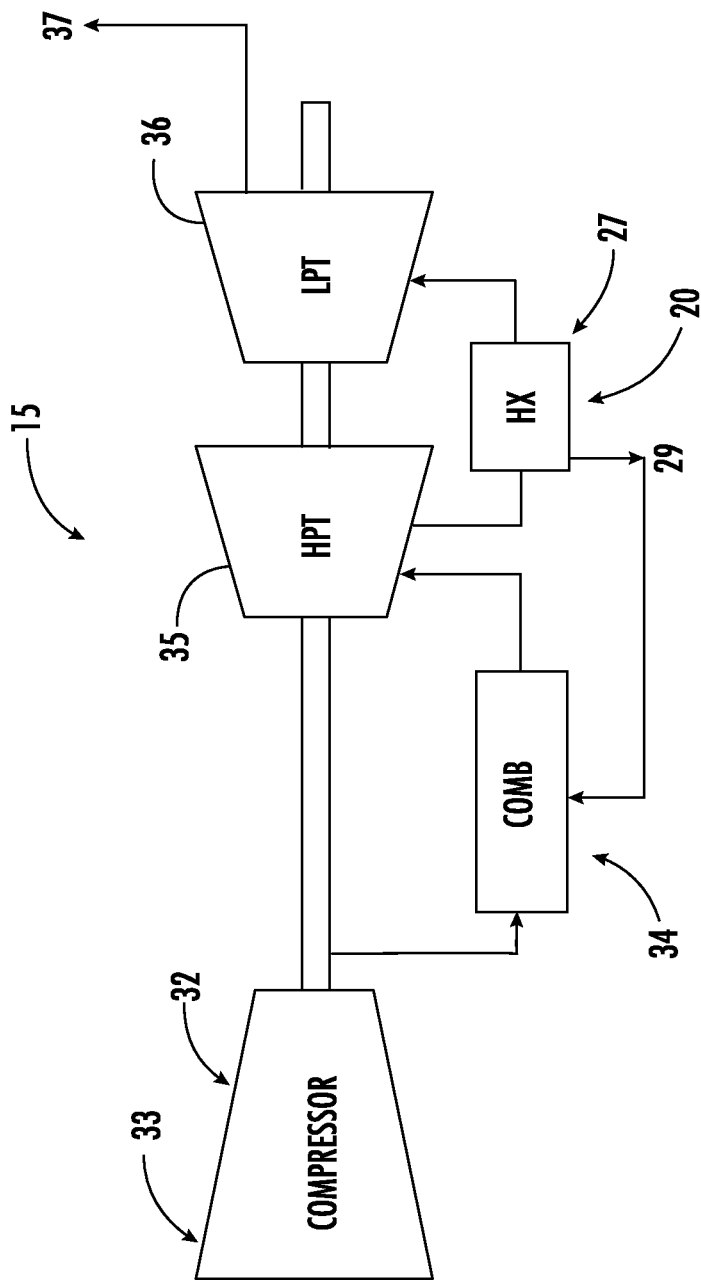
FIG. 7 is a schematic illustration of a gas turbine engine, similar to FIG. 6, utilizing a heat exchanger as described herein between turbine stages to reform a hydrocarbon fuel.

FIG. 7 is a schematic illustration of a gas turbine engine 15, similar to FIG. 6, utilizing a heat exchanger 20 as described herein between the high and low pressure turbine stages 35 and 36 to reform a hydrocarbon fuel.

With any of the exemplary embodiments described herein, a plurality of heat removal systems may be employed either in series or in parallel, and may share inlets and outlets or may be separately plumbed with individual sources and destinations for hydrocarbon fuel and reformed fuel.

With parallel heat removal systems, all systems may be operated concurrently or some systems may be deactivated for rejuvenation and removal of coke deposits or to modulate the level of heat removal capacity during various phases of aircraft operation.

FIG. 8 is a schematic diagram illustrating a method of operating the exemplary embodiment of FIG. 5. In FIG. 8, hot inlet air 33 enters the front of the gas turbine engine 15. The heat exchanger 20, which may be a single element arranged annularly and/or symmetrically about the engine centerline 40 or a plurality of individual heat exchanger elements, receives a liquid fuel 41 through inlet 27. This liquid fuel 41 then becomes vaporized fuel 42 which is then combined with oxygen-containing medium, such as bleed air 44 from the gas turbine engine compressor or water from a storage tank, for example, within the heat exchanger 20. The heat exchanger 20 then reforms the fuel using the available heat from the hot inlet air 33 and the oxygen-containing medium, such that reformed fuel 43 then exits the heat exchanger 20 through outlet 29. Conditioned air 45, which has a lower temperature than the hot inlet air 33, then flows to the gas turbine engine compressor 32, in the embodiments of FIGS. 5 and 9, or to the atmosphere in the embodiment of FIG. 6, or to the low pressure turbine 37 in the embodiment of FIG. 7. The hot inlet air 33 in the embodiment of FIGS. 5 and 9 could also be exhaust from the high pressure turbine 35 in the embodiment of FIG. 7, depending upon the installed location of the heat exchanger 20.

FIG. 9 is a cross-sectional schematic illustration of an exemplary embodiment of a gas turbine engine 15 suitable for use as an aircraft propulsion system similar to the embodiment of FIG. 5, but adapted to include a hyperburner system 70. In the embodiment of FIG. 9, the hyperburner 70 is similar to an augmentor or afterburner but is designed specifically for high-speed and/or hypersonic travel.

As with FIG. 4, in FIG. 9 the heat exchanger 20 is located in the inlet section 31 of the gas turbine engine 15. Liquid hydrocarbon fuel 41 is fed from a storage tank 52 through a supply line 58 to a first flow divider 48, which functions as a control valve, where a portion of the liquid hydrocarbon fuel 41 may be fed to fuel nozzles 54 located within the combustor section 34 of the gas turbine engine 15. Liquid fuel 41 may flow from the first flow divider 48 to a second flow divider, or control valve, 50, where liquid fuel 41 may be directed to the heat exchanger 20 through inlet 27 via supply line 58 or selectively to fuel nozzles 56 located aft of the high and low pressure turbines 35 and 36, respectively, in the hyperburner 70. A control valve 46 controls the flow of compressor discharge air, or bleed air, 44, to the reforming catalyst in the heat exchanger 20. Reformed (gaseous) fuel 60 departs the heat exchanger 20 through outlet 29 and flows to the hyperburner fuel nozzles 56 located in the hyperburner 70.

The hyperburner fuel nozzles 56 may be configured for "dual fuel" operation, that is, to operate with either liquid hydrocarbon fuel or gaseous reformed fuel, or both, as desired for the particular operating conditions present. The control valves or flow dividers may be operated by a control system which selectively directs liquid fuel to the gas turbine combustor and/or the hyperburner and also controls the flow of reformed fuel to the hyperburner from the heat exchanger. The proportions of the fuel flow to the main gas turbine engine combustor and hyperburner may be adjusted as needed, and in high-speed or hypersonic flight regimes flow splits such as about 5% to the main gas turbine engine combustor and 95% to the hyperburner may be utilized. Low pressures, such as 3-5 bar, may be experienced in the hyperburner which permits the hyperburner fuel supply system to operate at low pressures as well, minimizing the risks of leakage. Higher pressures may be experienced in the gas turbine combustor, requiring liquid fuel to be fed at higher pressures in that system.

FIG. 10 is a schematic illustration of an exemplary embodiment of a heat exchanger system 20 which incorporates a plurality of heat exchangers 20A, 20B, similar to the heat exchanger 20 of FIG. 4, the system being configured to operate with the gas turbine engine 15 of FIG. 9. In the embodiment of FIG. 10, the plurality of heat exchangers, or heat exchanger branches, 20A and 20B, may be separately supplied with liquid hydrocarbon fuel 41 and oxygen-containing compressor discharge air 44 via control valves 71, and similar control valves 71 may direct reformed fuel to either the gas turbine engine combustor fuel nozzles 54 or the hyperburner fuel nozzles 56 located at the turbine exit. As described previously, the plurality (which may be two or more) of heat exchangers may be operated together, or one or more may be deactivated for cleaning or based on a lower demand for reformed fuel.

Various hydrocarbon fuels may be utilized with the exemplary embodiments as described herein, including aircraft jet fuels such as Jet-A, JP-4, and JP-8, gasolines, kerosenes, rocket propulsion fuels such as RPS1 and RPS2, Diesel fuels such as D2 and D4, and blends, mixtures, and combinations thereof.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Various characteristics, aspects, and advantages of the present disclosure may also be embodied in any permutation of Aspects of the disclosure, including but not limited to the following technical solutions as defined in the enumerated Aspects:

1. In one aspect, a gas turbine engine includes: a compressor, a combustor, and a turbine in serial flow relationship; a heat exchanger, the heat exchanger having an inlet, an outlet, and an internal surface coated with a catalyst, the heat exchanger being located upstream of the compressor; a source of hydrocarbon fuel in fluid communication with the inlet of the heat exchanger; a source of oxygen in fluid communication with the inlet of the heat exchanger; and a distribution system for receiving reformed hydrocarbon fuel from the heat exchanger.

While this disclosure has been described as having exemplary embodiments, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine, the gas turbine engine comprising:
   a compressor, a combustor, and a turbine in serial flow relationship;
   a heat exchanger having an inlet, an outlet, and an internal surface coated with a catalyst, the heat exchanger being located upstream of the compressor;
   a source of hydrocarbon fuel in fluid communication with the inlet of the heat exchanger;
   a source of oxygen in fluid communication with the inlet of the heat exchanger;
   a distribution system for receiving reformed hydrocarbon fuel from the heat exchanger; and
   a hyperburner or augmentor, wherein the hyperburner or augmentor includes a hyperburner fuel nozzle, and wherein the distribution system is configured to selectively deliver liquid hydrocarbon fuel or reformed hydrocarbon fuel to the fuel nozzle.

2. The gas turbine engine of claim 1, wherein the distribution system delivers reformed hydrocarbon fuel to the gas turbine engine.

3. The gas turbine engine of claim 1, wherein the distribution system delivers reformed hydrocarbon fuel to the hyperburner or augmentor.

4. The gas turbine engine of claim 1, wherein the distribution system delivers liquid hydrocarbon fuel to the combustor and reformed gaseous hydrocarbon fuel to the hyperburner.

5. The gas turbine engine of claim 1, wherein the hydrocarbon fuel includes an aircraft jet fuel, a gasoline, a kerosene, a rocket propulsion fuel, a diesel fuels, or blends, mixtures, or combinations thereof.

6. The gas turbine engine of claim 1, wherein the source of oxygen includes an oxygen-containing species.

7. The gas turbine engine of claim 6, wherein the oxygen-containing species comprises steam or liquid water.

8. The gas turbine engine of claim 1, wherein the source of oxygen includes an oxygenated fuel.

9. The gas turbine engine of claim 6, wherein the oxygenated fuel comprises ethanol or methanol.

10. The gas turbine engine of claim 1, wherein the system includes a plurality of heat exchangers or heat exchanger branches.

11. The gas turbine engine of claim 10, wherein the plurality of heat exchangers are arranged in series.

12. The gas turbine engine of claim 10, wherein the plurality of heat exchangers are arranged in parallel.

13. A method of operating a gas turbine engine, the gas turbine engine having a compressor, a combustor, and a turbine in serial flow relationship, the gas turbine engine also having a heat exchanger upstream of the compressor, the heat exchanger being in fluid communication with a source of hydrocarbon fuel and a source of water and having an internal surface coated with a catalyst, the method comprising:
   introducing a hydrocarbon fuel into the heat exchanger;
   introducing oxygen into the heat exchanger;
   contacting the hydrocarbon fuel with the catalyst; and
   cracking the hydrocarbon fuel to form a reformed hydrocarbon fuel and remove heat from the aircraft component; and
   delivering the reformed hydrocarbon fuel to a hyperburner or augmentor of the gas turbine engine, wherein the hyperburner or augmentor includes a hyperburner fuel nozzle, and wherein the distribution system is configured to selectively deliver liquid hydrocarbon fuel or reformed hydrocarbon fuel to the fuel nozzle.

14. The method of claim 13, wherein the hydrocarbon fuel includes an aircraft jet fuel, a gasoline, a kerosene, a rocket propulsion fuel, a diesel fuels, or blends, mixtures, or combinations thereof.

15. The method of claim 13, wherein the source of oxygen is an oxygen-containing species or an oxygenated fuel.

16. The method of claim 13, wherein the method includes a plurality of heat exchangers.

17. The method of claim 16, wherein the plurality of heat exchangers are arranged in series or in parallel.

18. The method of claim 16, wherein a distribution system delivers reformed fuel to a gas turbine engine.

\* \* \* \* \*